(12) United States Patent
Gupta et al.

(10) Patent No.: US 12,009,946 B2
(45) Date of Patent: Jun. 11, 2024

(54) GATEWAY AND BRIDGE DEVICES FOR SECURE INTERNET OF THINGS

(71) Applicant: DATAKREW PTE. LTD., Singapore (SG)

(72) Inventors: Naina Gupta, Singapore (SG); Arpan Jati, Singapore (SG); Anupam Chattopadhyay, Singapore (SG); Sumanta Bose, Singapore (SG)

(73) Assignee: DataKrew Pte. Ltd., Singapore (SG)

( * ) Notice: Subject to any disclaimer, the term of this patent is extended or adjusted under 35 U.S.C. 154(b) by 0 days.

(21) Appl. No.: 18/044,638

(22) PCT Filed: Sep. 15, 2021

(86) PCT No.: PCT/SG2021/050559
§ 371 (c)(1),
(2) Date: Mar. 9, 2023

(87) PCT Pub. No.: WO2022/060296
PCT Pub. Date: Mar. 24, 2022

(65) Prior Publication Data
US 2023/0336374 A1    Oct. 19, 2023

(30) Foreign Application Priority Data
Sep. 16, 2020 (SG) .............. 10202009083R

(51) Int. Cl.
*H04L 12/08* (2006.01)
*H04L 9/00* (2022.01)
*H04L 9/08* (2006.01)
*H04L 12/46* (2006.01)

(52) U.S. Cl.
CPC .......... *H04L 12/4625* (2013.01); *H04L 9/002* (2013.01); *H04L 9/0852* (2013.01)

(58) Field of Classification Search
CPC .... H04L 12/4625; H04L 9/002; H04L 9/0852
USPC ....................................................... 709/223
See application file for complete search history.

(56) References Cited

U.S. PATENT DOCUMENTS

| | | | |
|---|---|---|---|
| 8,522,337 B2* | 8/2013 | Adusumilli | ........... H04L 63/205 709/230 |
| 2007/0087829 A1* | 4/2007 | Liu | ...................... G07F 17/3276 463/42 |
| 2015/0143118 A1* | 5/2015 | Sheller | ...................... H04L 9/14 713/168 |

(Continued)

OTHER PUBLICATIONS

The International Search Report (ISR) with Written Opinion for PCT/SG2021/050559 dated Oct. 18, 2021, pp. 1-10.

(Continued)

*Primary Examiner* — Jude Jean Gilles
(74) *Attorney, Agent, or Firm* — MCDONNELL BOEHNEN HULBERT & BERGHOFF LLP

(57) ABSTRACT

Gateway and bridge devices for internet of things systems are described. The gateway device is configured to communicate with a server using signals encrypted according to a first encryption protocol and to communicate with bridge device using signals encrypted with a second protocol. The bridge device is configured to decrypt the signals received from the gateway device and to communicate with sensors and actuators. The bridge device is further configured to encrypt data signals from the sensors for sending to the gateway device.

19 Claims, 4 Drawing Sheets

(56) References Cited

U.S. PATENT DOCUMENTS

2017/0026345 A1\* 1/2017 Salek ................. H04W 12/033
2018/0048627 A1   2/2018 Reese
2019/0098052 A1\* 3/2019 Kim ................... H04L 63/0485
2019/0281661 A1   9/2019 Magley et al.

OTHER PUBLICATIONS

Bonetto et al., "Secure communication for smart IoT objects: Protocol stacks, use cases and practical examples", 2012 IEEE international symposium on a world of wireless, mobile and multimedia networks (WoWMoM), IEEE, 2012.
Crockett et al., "Prototyping post-quantum and hybrid key exchange and authentication in TLS and SSH", IACR Cryptol. ePrint Arch., 2019.
Folkens, "Building a gateway to the Internet of Things", Product Marketing Engineer, Texas Instruments, 2014.
OpenFog Consortium Architecture Working Group, "OpenFog reference architecture for fog computing", OPFRA00J, 20817, 2017.

\* cited by examiner

GATEWAY AND BRIDGE DEVICES FOR SECURE INTERNET OF THINGS

This application is a U.S. national phase of International Application No. PCT/SG2021/050559, filed on Sep. 15, 2021, which claims priority to Singapore Patent Application No. 10202009083R, filed Sep. 16, 2020, both of which are incorporated by reference herein in their entirety.

TECHNICAL FIELD

The present disclosure relates to gateway and bridge devices for secure internet of things systems.

BACKGROUND

In recent years, the number of connected internet of things (IoT) devices has increased tremendously. It has been estimated that more than 75 billion IoT devices will be connected by 2025. This is mainly due to the advancement in technology which has led to the development of low-cost IoT devices with improved performance and energy efficiency. This has created opportunities for a wide variety of industry sectors such as healthcare, agriculture, autonomous cars, etc., and has also improved living standards in the form of smart home automation, smart buildings, etc. Even though such smart systems have a great potential in improving our living standards as well as in the industry, this growth has also widened the overall cyber-threat landscape for IoT. As a result, it has become challenging to embed security measures to the wide variety of IoT devices.

In a typical architecture for IoT-based control systems, sensors and actuators are deployed in the field and are used to capture disparate data points, for example temperature, pressure, humidity, etc. The database server, application server and HMI (Human Machine Interface) are used for remote monitoring, storing historical data, performing analysis, etc. The gateway acts as the intermediary for communication between the sensors/actuators and the servers. Even though the gateway is an intermediary, it is one of the most crucial components in any IoT infrastructure. The gateway is responsible for collection and transmission of the sensor data to the servers for analysis. It is also responsible for receiving the analysis output from the server and sending respective command signals to the actuators. For communication between sensors/actuators and gateway, several protocols can be used like, Modbus, LoRa etc., whereas communication between gateway and the servers is typically done using Transport Layer Security (TLS). The correct operation of an automated IoT system to achieve its desired outcome depends on three key steps: (i) INPUT: accurate data acquisition from the sensors; (ii) PROCESSING: precise data processing for the decision-making; and (iii) OUTPUT: accurate control signals to the actuators. Tampering with any of the three steps will make it difficult for the automated IoT system to achieve its desired outcome.

There are two possible scenarios for deployment of sensor/actuator nodes and the gateway: Scenario A) The gateway and sensor nodes are deployed on-premises and are located in very close proximity. Scenario B) The gateway and sensor nodes are not close to each other but connected over large distances. This includes connections within a large building, or between different buildings or outdoor sites. In case of Scenario A, it is difficult to tamper the data through a man-in-the-middle attack as the sensor and gateway nodes are physically connected very close to each other. Whereas in Scenario B, since the distance is quite large, and the connections are typically not secure, it is easier to tamper the data in transit or even perform a man-in-the-middle attack to impersonate the sensor or gateway. Apart from this, a wide range of vulnerabilities exist for the individual components as well as for the entire connected system. Any successful attack on the system can result in significant damage for both industries and the individual users. For instance, in the smart healthcare industry, if any critical/sensitive data captured by the sensor is tampered in transit, it can result in wrong dosage for the patient. This can further harm the patient's health or even be fatal. In case of autonomous cars, an attacker can tamper with the command signals resulting in accidents or some other catastrophic events. Similar eventualities are apparent for other industries as well.

It is a common practice in industry to design the base IoT system first and patch security features later as add-ons targeting individual IoT components. This is mainly to ensure compatibility with the existing solutions. But such an approach of integrating security solutions at a later stage result in security gaps when the complete solution is implemented.

SUMMARY

The present disclosure provides gateway devices and bridge devices for monitoring systems in which sensors and/or actuators are coupled to a bridge device and the bridge device is configured to encrypt data signals for sending to a gateway device and to decrypt command signals received form the gateway device. Similarly, the gateway device is configured to decrypt the data signals received from bridge device and to encrypt command signals before sending them to the bridge device. Thus, the system provides for protection of communication between the gateway device and the sensors and actuators. Additionally, communication between the gateway device and monitoring servers is also encrypted and protected.

According to a first aspect of the present disclosure, a gateway device is provided. The gateway device comprises: a first interface configured to receive command signals encrypted according to a first encryption protocol from a server and to send data signals encrypted according to the first encryption protocol to the server; a second interface configured to send command signals encrypted according to a second encryption protocol to a bridge device and to receive data signals encrypted according to the second encryption protocol from the bridge device; cryptographic key storage configured to store cryptographic keys for the first encryption protocol and cryptographic keys for the second encryption protocol; and a processor configured to: decrypt command signals encrypted according to the first encryption protocol using the cryptographic keys for the first encryption protocol and encrypt the command signals according to the second encryption protocol; and decrypt data signals encrypted according to the second encryption protocol using the encryption keys for the second encryption protocol and encrypt the data signals according to the first encryption protocol.

In an embodiment, the first encryption protocol is a transport layer security (TLS) protocol, for example, the TLS v1.3 protocol.

In an embodiment, the second encryption protocol is a lightweight secure data communications protocol.

In an embodiment, the first encryption protocol and or the second encryption protocol is a hybrid of pre-quantum encryption algorithms and post-quantum algorithms.

In an embodiment, the processor is further operable to initiate a key exchange with the server and/or the bridge device.

In an embodiment, the processor is further configured to check and/or transform, and/or filter, and/or consolidate the command signals after decryption and before encryption.

In an embodiment, the processor is further configured to check and/or transform, and/or filter, and/or consolidate the data signals after decryption and before encryption.

In an embodiment, the processor is further configured to analyze the data signals and determine integrity of the data signals.

In an embodiment, the processor is further operable to monitor a power supply and/or tamper inputs to detect physical intrusions.

In an embodiment, the processor is operable to delete the cryptographic keys stored in the cryptographic key storage if a physical intrusion is detected.

According to a second aspect of the present disclosure, a bridge device is provided. The bridge device comprises: a device interface configured to send command signals to an actuator device and to receive data signals from a sensor device; a gateway interface configured to receive command signals encrypted according to an encryption protocol from a gateway device and to send data signals encrypted according to the encryption protocol to the gateway device; cryptographic key storage configured to store encryption keys for the encryption protocol; and a processor configured to decrypt command signals encrypted according to the encryption protocol and to send the decrypted command signals to the actuator device and to encrypt data signals received from the sensor device according to the encryption protocol and send the encrypted data signals to the gateway device.

In an embodiment, the encryption protocol is a lightweight secure data communications protocol.

In an embodiment, the first encryption protocol and or the second encryption protocol is a hybrid of pre-quantum encryption algorithms and post-quantum algorithms.

In an embodiment, the processor is further configured to check and/or transform, and/or filter, and/or consolidate the command signals after decryption and before sending to the sensor device.

In an embodiment, wherein the processor is further configured to check and/or transform, and/or filter, and/or consolidate the data signals before encryption.

In an embodiment, the processor is further configured to analyze the data signals and determine integrity of the data signals. In an embodiment, wherein the processor is further operable to monitor a power supply and/or tamper inputs to detect physical intrusions.

In an embodiment, the processor is operable to delete the cryptographic keys stored in the cryptographic key storage if a physical intrusion is detected.

According to a third aspect of the present disclosure, a monitoring system is provided. The monitoring system comprises: a gateway device as described above; a bridge device as described above; at least one sensor coupled to the bridge device; and at least one actuator coupled to the bridge device.

BRIEF DESCRIPTION OF THE DRAWINGS

In the following, embodiments of the present invention will be described as non-limiting examples with reference to the accompanying drawings in which.

DETAILED DESCRIPTION

The present disclosure provides internet of things systems and devices which ensure "security-and-privacy-by-design" rather than developing the base system first and adding security features at a later stage.

Figure 1:
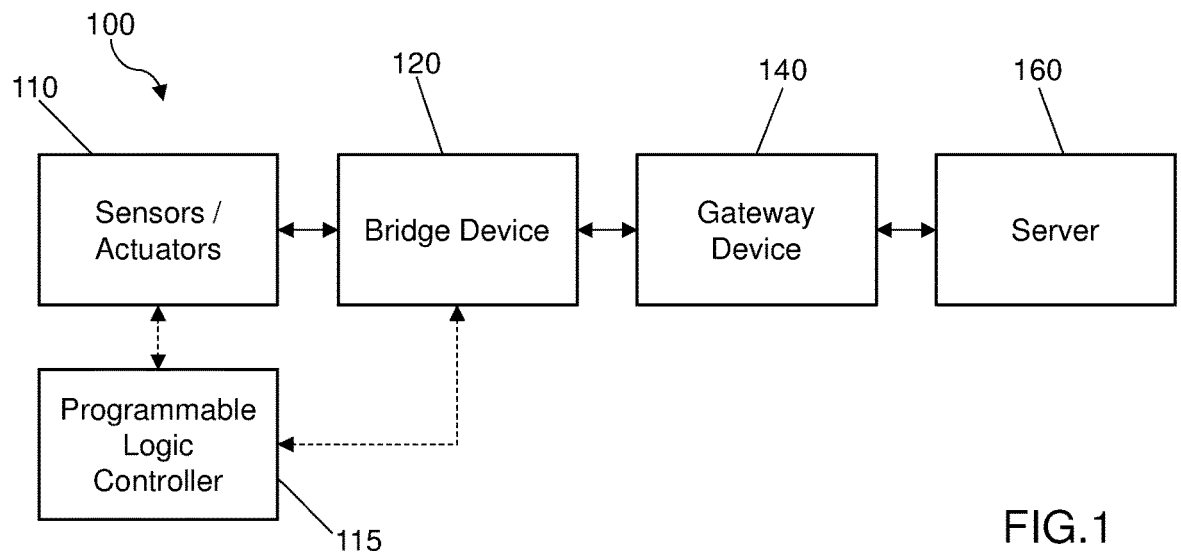
FIG. 1 is a block diagram showing an internet of things architecture comprising a gateway device and a bridge device according to embodiments of the present invention.

FIG. 1 is a block diagram showing an internet of things architecture comprising a gateway device and a bridge device according to embodiments of the present invention. As shown in FIG. 1, the internet of things system 100 comprises sensors and actuators 110 which may be controlled by a programmable logic controller 115. The sensors and actuators 110 are in communication with a bridge device 120. The connection between the sensors/actuators 110 and the bridge device 120 may be over a wired serial connection such as a MODBUS connection. Communication between the programmable logic controller 115 and the bridge device may also be over a wired serial connection such as a MODBUS connection.

The bridge device 120 is connected to a gateway device 140. The connection between the bridge device 120 and the gateway device 140 is over a secure communication channel which may be implemented as a post quantum enabled secure communication channel to ensure future-proof security. The secure communication channel may be implemented as a lightweight secure communication channel. The secure communication channel may be a wired channel such as an RS485 channel or wireless communication channel such as a LoRa communication channel.

The gateway device 140 is connected to a server 160 which performs analysis of data sensed by the sensors and generates control signals for the actuators. The connection between the gateway device 140 and the server 160 is over a secure communication channel which may be implemented as a post quantum enabled secure communication channel. The secure communication channel between the gateway device 140 and the server 160 may be over a wired channel such as an Ethernet connection or a wireless connection such as a WiFi connection, a Bluetooth connection or a LoRa connection.

The internet of things system 100 allows communication between the sensors/actuators 110 or the programmable logic controller 115 and the gateway device 140 to be effectively secured without the requirement for changes to the sensors/actuators 110. The bridge device 120 is placed close to the sensors/actuators 110 and provides for encryption and security of the communication with the gateway device 140.

The present disclosure provides a family of secure devices encompassing the bridge device 120 and the gateway device 140 to enable security when collecting the data from sensors, storing the data in the devices as well as when in transit. The use of embedded security measures in bridge device 120 and gateway device 140 will significantly reduce the attacks targeted towards the IoT infrastructure in question. Commercially available sensors and actuators typically do not natively support secure and encrypted communications. Hence, one approach could be to upgrade the currently deployed sensors and actuators to ensure security. Such a solution can incur a lot of capital expenditure to integrate security into the existing systems; and furthermore, it may not always be possible to upgrade legacy hardware.

The proposed system provides a low-cost solution that ensures security as well as retrofit compatibility with the existing/legacy systems. Therefore, within the family of devices, multiple smart and secure IoT devices are proposed. Firstly, the gateway device 140 to send data securely to the outside network which may be implemented as a server 160 such as a SCADA PC, HMI, Cloud Server, etc.; and secondly the bridge device 120 which acts as a bridge between the sensors/actuators 110 or the programmable logic controllers (PLCs) 115 and the gateway device 140. It should be noted that while FIG. 1 shows a single bridge device 120 connected to the gateway device 140 it is envisaged that one gateway device could be connected to multiple bridge devices over different types of topologies.

Figure 2:
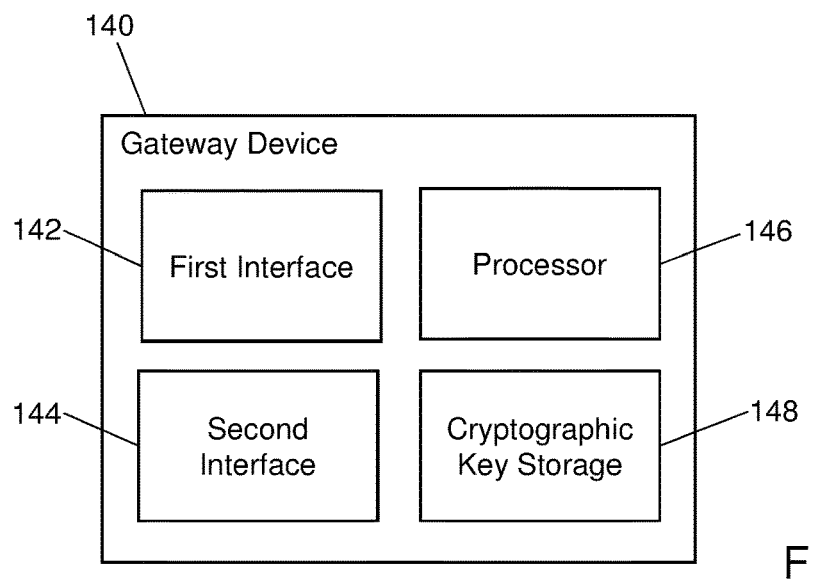
FIG. 2 is a block diagram showing a gateway device according to an embodiment of the present invention.

FIG. 2 is a block diagram showing a gateway device according to an embodiment of the present invention. The gateway device 140 comprises a first interface 142, a second interface 144, a processor 146 and a cryptographic key storage 148. The first interface 142 is configured to receive signals encrypted according to a first encryption protocol from the server 160 and to send signals encrypted according to the first protocol to the server 160. The second interface is configured to receive signals encrypted according to a second encryption protocol from the bridge device 120 and to send signals encrypted according to the second encryption protocol to the bridge device 120. The processor 146 is configured to decrypt the signals received by the first interface 142 and the second interface 144 using respective encryption keys stored in the cryptographic key storage 148. The processor 146 is also configured to encrypt signals for transmission by the first interface 142 or the second interface 144 using the respective encryption keys stored in the cryptographic key storage 148. A more detailed embodiment of the gateway device is described below with reference to FIG. 4.

Figure 3:
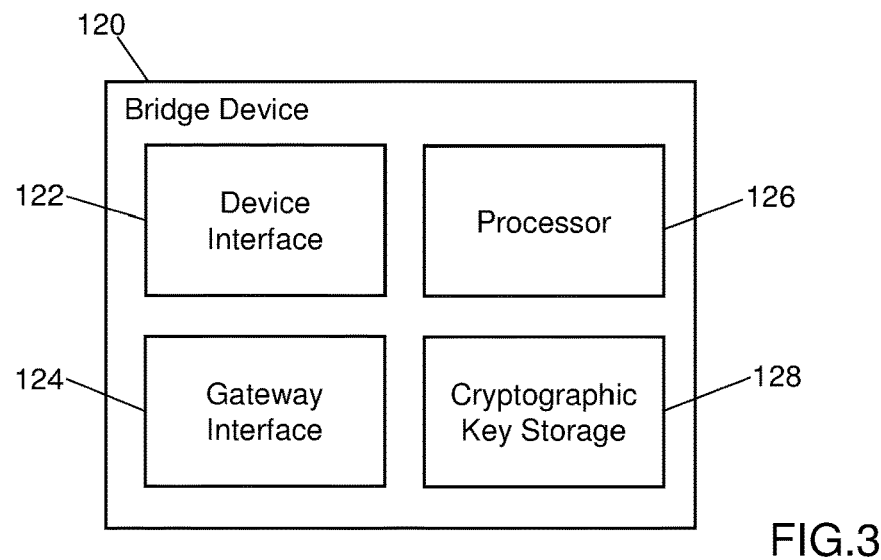
FIG. 3 is a block diagram showing a bridge device according to an embodiment of the present invention.

FIG. 3 is a block diagram showing a bridge device according to an embodiment of the present invention. The bridge device 120 comprises a device interface 122, a gateway interface 124, a processor 126 and a cryptographic key storage 128. The device interface 122 is configured to receive signals from the sensors/actuators 110 and the programmable logic controller 115 and to send signals to the sensors/actuators 110 and the programmable logic controller 115. The gateway interface 124 is configured to receive signals encrypted according to an encryption protocol from the gateway device 140 and to send signals encrypted according to the encryption protocol to the gateway device 140. The processor 126 is configured to decrypt signals received by the gateway interface 124 using encryption keys stored in the cryptographic key storage 128 and to encrypt signals for sending to the gateway device 140 via the gateway interface 124 using encryption keys stored in the cryptographic key storage 128. A more detailed embodiment of the bridge device is described below with reference to FIG. 5.

Figure 4:
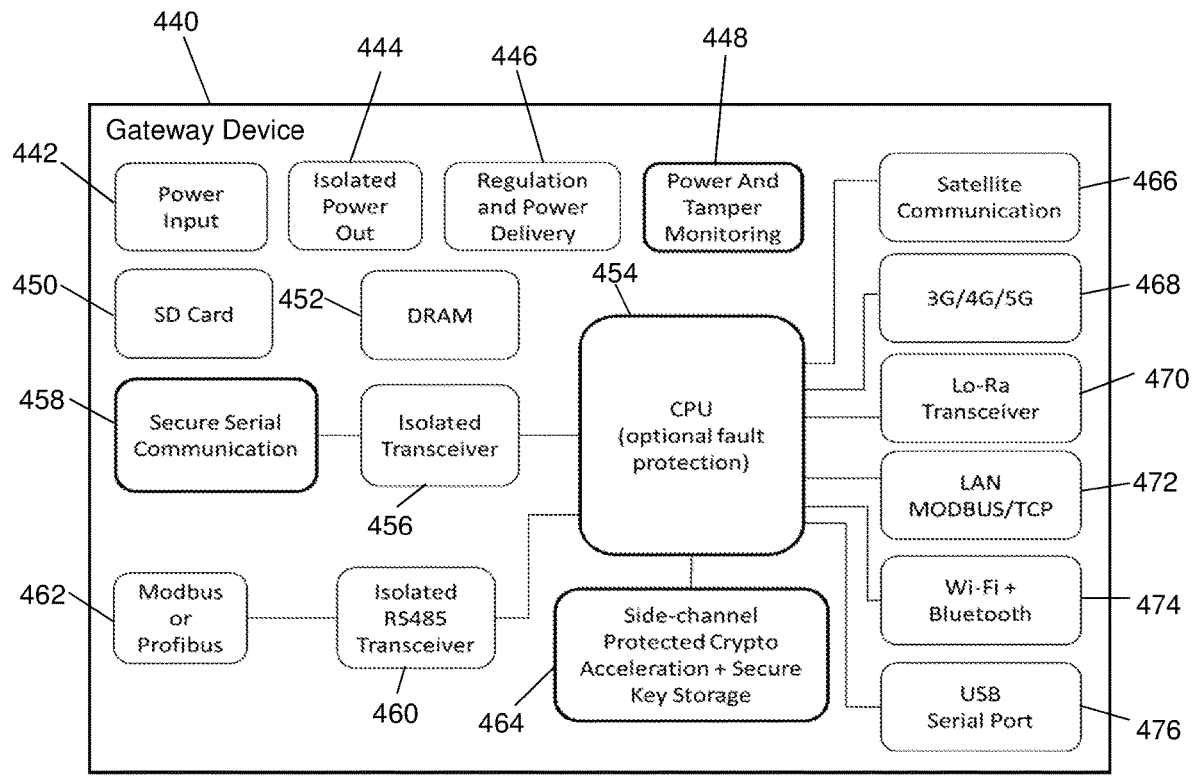
FIG. 4 is a block diagram showing a gateway device according to an embodiment of the present invention.

FIG. 4 is a block diagram showing a gateway device according to an embodiment of the present invention. The gateway device 440 shown in FIG. 4 has features which correspond to the features of the gateway device 140 shown in FIG. 2.

As shown in FIG. 4, the gateway device 440 comprises a power input 442, an isolated power out 444, a regulation and power delivery module 446, a power and tamper monitoring module 448, an SD card 450, and dynamic RAM (DRAM) 452. The gateway device 440 further comprises a central processing unit (CPU) 454. Various communication and encryption modules are coupled to the CPU 454. An isolated transceiver 456 which is coupled to a secure serial communication module 458 is coupled to the CPU 454. An isolated RS485 transceiver 460 which is coupled to a MODBUS or Profibus module 462 is coupled to the CPU 454. A side channel protected crypto acceleration and secure key storage 464 is coupled to the CPU. A satellite communication module 466, a 3G/4G/5G module 468, a Lo-Ra transceiver 470, a LAN MODBUS/TCP module 472, a Wi-Fi and Bluetooth module 474 and a USB serial port 476 are also coupled to the CPU 454. The CPU 454 may be provided with fault protection.

The 454 CPU is connected to all the peripherals and is responsible for gathering data from all the connected bridge devices and sensors and sending them in a timely manner to the remote server. To receive data, any of the input interfaces can be used.

An isolated Modbus interface provided by the isolated RS485 transceiver 460 and the MODBUS or Profibus module 462 is also available on the gateway device 440. A separate interface is provided by the isolated transceiver 456 and the secure serial communication module 458 for communication with bridge devices. This interface supports encryption of payload and secure key-exchange for enhanced security and data integrity. The transmission of data to the server can use any of the following output interfaces: Modbus-TCP, Wi-Fi, Bluetooth, Cellular, LoRa and USB 2.0 based communication.

The gateway device 440 has a system voltage of 12V and supports input voltage from the following two sources, namely the USB serial port 476 and input DC Jack provided by the power input 442. For improved redundancy, the board can automatically switch between the power sources as required. The board also provides one isolated power output 444 for driving sensor nodes. The side channel protected crypto acceleration and secure key storage 464 is used to store private keys. These keys are used to establish secure connection with the server and bridge devices.

Additionally, the power and tamper monitoring module 448 monitors power for glitches and tamper inputs are also monitored to detect physical intrusions. The gateway device 440 can be configured to delete secure data or keys on such events to protect against malicious attacks.

The CPU 454 of the gateway device 440 shown in FIG. 4 corresponds to the processor 146 of the gateway device 140 shown in FIG. 2. The isolated transceiver 456 and secure serial communication module 458 of the gateway device 440 shown in FIG. 4 corresponds to the second interface 144 of the gateway device 140 shown in FIG. 2. The satellite communication module 466, the 3G/4G/5G module 468, the Lo-Ra transceiver 470, the LAN MOD- BUS/TCP module 472, the Wi-Fi and Bluetooth module 474 or the USB serial port 476 of the gateway device 440 shown in FIG. 4 corresponds to the first interface 142 of the gateway device 140 shown in FIG. 2. The side channel protected crypto acceleration and secure key storage 464 of the gateway device 440 shown in FIG. 4 corresponds to the cryptographic key storage 148 of the gateway device 140 shown in FIG. 2.

Figure 5:
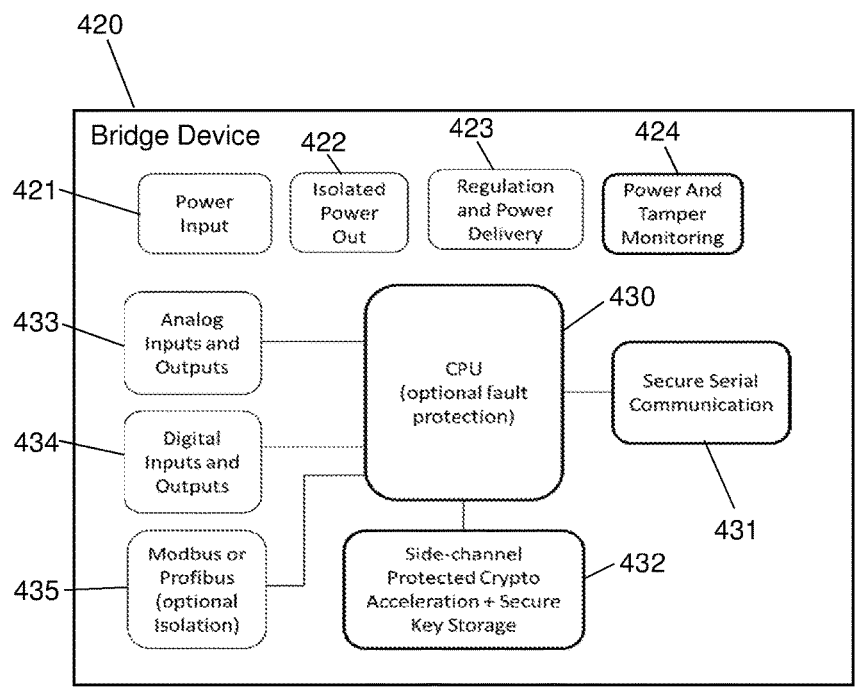
FIG. 5 is a block diagram showing a bridge device according to an embodiment of the present invention.

FIG. 5 is a block diagram showing a bridge device according to an embodiment of the present invention. The bridge device 420 shown in FIG. 5 has features which correspond to the features of the gateway device 120 shown in FIG. 3. As shown in FIG. 5, the bridge device 420 comprises a power input 421, an isolated power out 422, a regulation and power delivery module 423, and a power and tamper monitoring module 424. The bridge device 420 further comprises a central processing unit (CPU) 430. Various communication and encryption modules are coupled to the CPU 430. A secure serial communication module 431 is coupled to the CPU 430. A side channel protected crypto acceleration and secure key storage 432 is coupled to the CPU 430. An analog input and output module 433, a digital input and output module 434 and a MODBUS or Profibus module 435 are also coupled to the CPU 430.

The bridge device 420 is used between sensors, actuators, the programmable logic controller and the gateway device 440. Depending on the application, the analog input and output module 433, the digital input and output module 434 or the MODBUS or Profibus module 435 may be connected to sensors, actuators or the programmable logic controller. The input from the sensors/PLCs can be received in using any of the input interfaces. This input is then encrypted and transmitted to the gateway securely using the secure serial communication module 431. Similarly, inputs from the gateway are received, decrypted, and transmitted to the respected actuator/PLC.

The security and protection mechanisms provided by the power and tamper monitoring module 424 are similar for both the gateway device 440 and the bridge device 420. The operation of real-time sensor data security analysis carried out by the CPU 430 of the bridge device 420 or the CPU 454 of the gateway device 440 will now be described with reference to FIG. 6.

Figure 6:
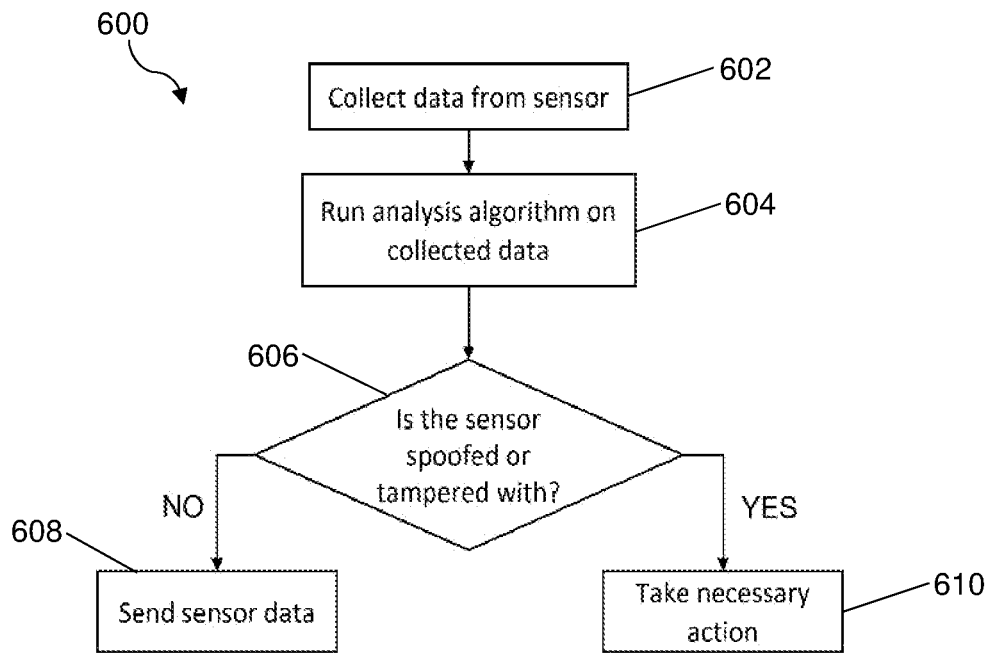
FIG. 6 is a flowchart showing a method of processing sensor data in a gateway device or a bridge device according to an embodiment of the present invention.

FIG. 6 is a flowchart showing a method of processing sensor data in a gateway device or a bridge device according to an embodiment of the present invention.

Apart from ensuring the confidentiality and the integrity of the data (sensor data and control signals) using secure communication channels, it is important to ensure the authenticity as well as the integrity of the data when it is collected from the sensors.

This is necessary as the decision-making process relies heavily on this collected data, any tampering or spoofing on the sensor side will result in catastrophic results. Hence, real-time analysis of the data from sensors is performed by the firmware in gateway device or bridge device whichever is closer to the sensor. This analysis is used to identify whether the sensor data is reliable or not. Such real-time processing on the device itself ensures correct functioning of the system in the events of communication delay, network failure, etc. FIG. 6. shows the high-level flow diagram for real-time sensor data processing. The analysis algorithm can be based on statistical methods or can be a machine learning based algorithm integrated into the firmware.

In step 602, the device (either the bridge device 420 or the gateway device 440) receives data from a sensor.

In step 604, an analysis algorithm is run on the collected data. As described above, the analysis algorithm determines whether the collected data is reliable or not.

In step 606, it is determined whether the sensor has been spoofed or tampered with based on the result of the analysis carried out in step 604. If it is determined that the sensor has not been spoofed or tampered with, the method moves to step 608. If it is determined that the sensor has been spoofed or tampered with, the method moves to step 610.

In step 608, the sensor data is sent to the server or gateway device.

In step 610, if the sensor data has been determined to have been spoofed or tampered with action is taken. This may include flagging the data and creating event logs and alerts.

If the gateway device and bridge device are unprotected, it can allow for a wide variety of attacks as they might be deployed in an open environment. For instance, an attacker can load a corrupt firmware into the device and interfere with the decision-making process. Hence, it is important to ensure the correct execution of trusted and valid instructions. For this purpose, secure boot, firmware encryption and memory bus encryption are used.

Further, passive attacks, like SPA (Simple Power Analysis), DPA (Differential Power Analysis) can be used to recover sensitive information such as cryptographic keys, sensors data, etc., while in use during a computation. An attacker usually exploits some form of leakage from the device to carry out the attack and obtain the secret information. If the cryptographic keys are compromised from the device, it can result in massive data breach.

Therefore, the firmware of the gateway device and bridge device is integrated with side-channel protected implementations, i.e., countermeasures to prevent leakage patterns. Also, to prevent unauthorized access while performing such sensitive operations, the devices are designed to support secure enclaves such as ARM TrustZone. Additional fault protection measures can be enabled for certain applications when suitable.

Method for encrypting communication between the gateway device and the server and between the bridge device and the gateway device will now be described with reference to FIG. 7 and FIG. 8.

Figure 7:
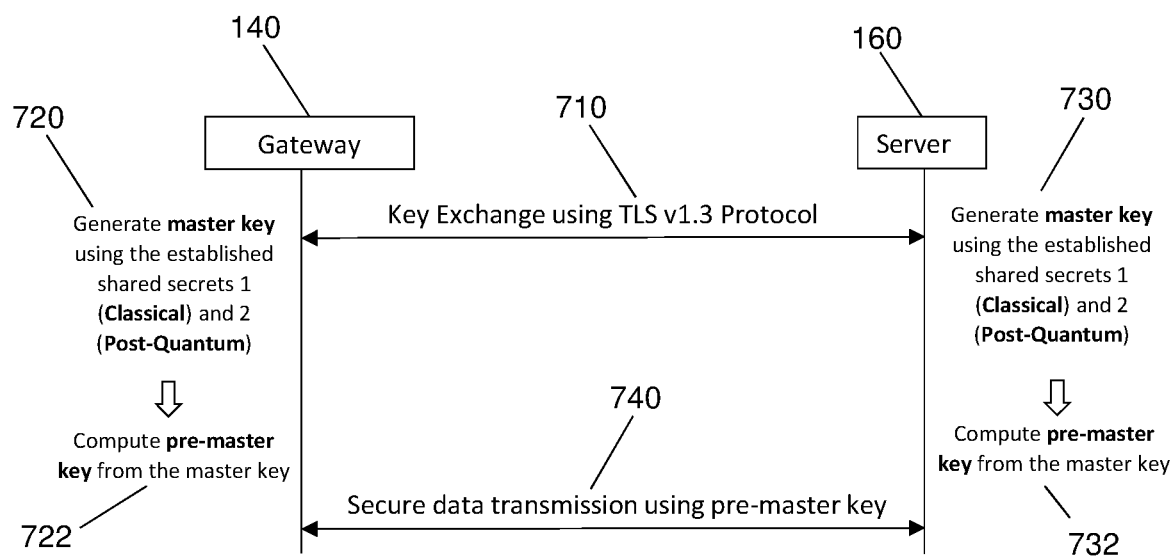
FIG. 7 is a message flow diagram showing data exchange between a gateway device according to an embodiment of the present invention and a server.

FIG. 7 is a message flow diagram showing data exchange between a gateway device according to an embodiment of the present invention and a server. Lattice-based post-quantum algorithms have emerged as promising candidates for post-quantum key exchange. Furthermore, XMSS has already been standardized in Europe as a post-quantum digital signature scheme. The communication uses TLS v1.3 protocol with the key-exchange implemented using a hybrid approach (using both pre-quantum/classical and post-quantum algorithms simultaneously). This is to ensure continued security even if the secret keys from one of the cryptosystems is compromised in the future. Using the hybrid approach, one shared secret is computed using a classical algorithm and another shared secret is computed based on a post-quantum algorithm. The two generated shared secrets are combined using any mathematically secure cryptographic function.

As shown in FIG. 7, initially, the gateway device 140 and the server 160 perform key exchange 710 using the TLS v1.3 protocol. Then the gateway device 140 generates a master key 720 using a combination of classical and post quantum techniques. The gateway device 140 then computes a pre-master key 722 from the master key. Similarly, the server 160 also generates a master key 730 using a combination of classical and post quantum techniques. The server 160 then computes the pre-master key 732 from the master key. This allows secure data communication 740 between the gateway device 140 and the server 160 using the pre-master key.

Figure 8:
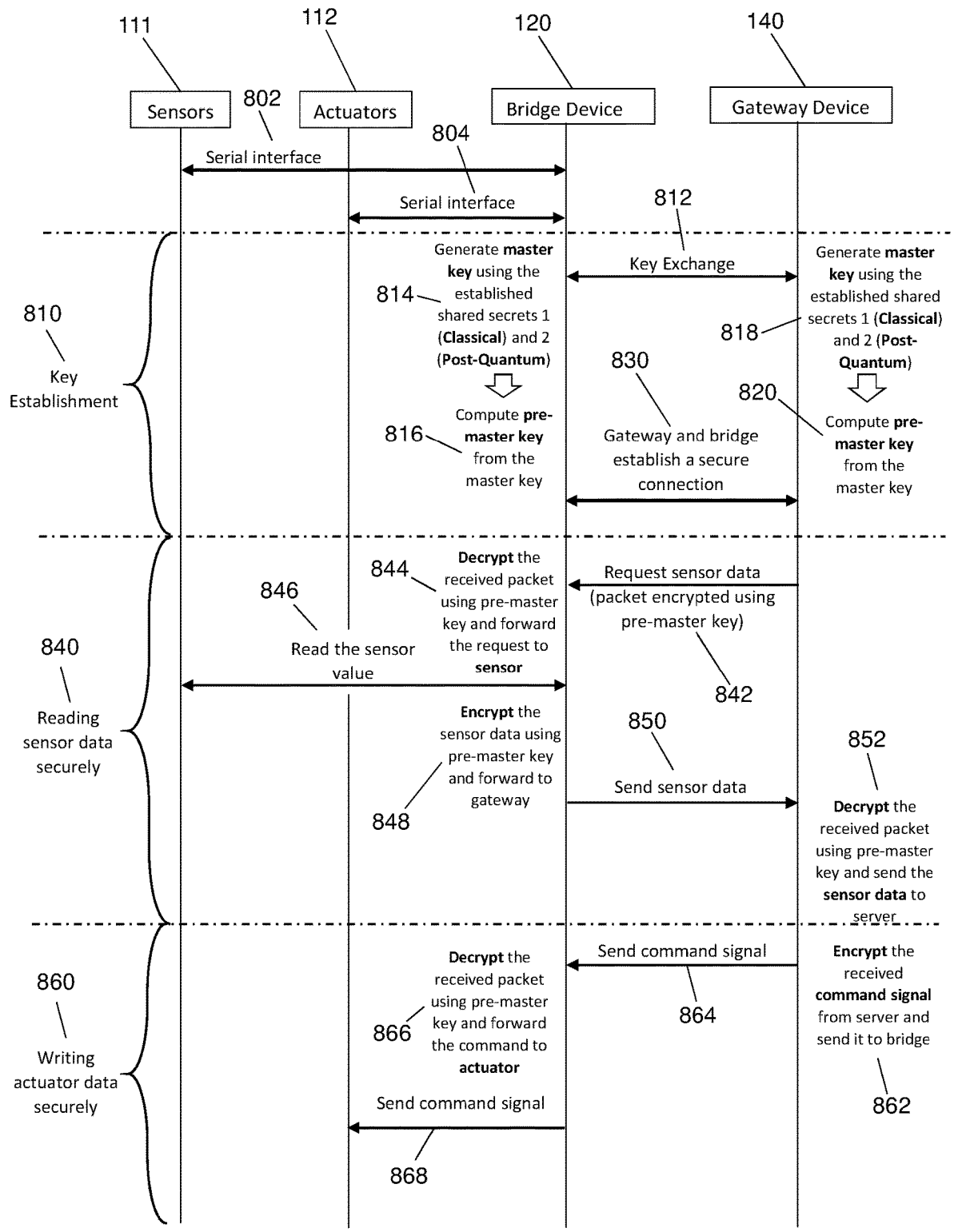
FIG. 8 is a message flow diagram showing data exchange between a gateway device according to an embodiment of the present invention and a bridge device according to an embodiment of the present invention.

FIG. 8 is a message flow diagram showing data exchange between a gateway device according to an embodiment of the present invention and a bridge device according to an embodiment of the present invention.

As shown in FIG. 8, the sensors 111 are connected using a serial interface 802 with the bridge device 120 to establish a secure channel with the gateway device 140. Similarly, the actuators 112 are connected using a serial interface 804 with the bridge device 120 to establish a secure channel with the gateway device 140. This ensures secure communication between sensors and the gateway device 140, and between the gateway device 140 and the actuators 112. FIG. 8 shows a brief overview of the packet exchanges between the different entities. To transmit or receive any data securely, the bridge device 120 performs a key establishment 810 with the gateway device 140 using a combination of random data and/or its private keys. A key exchange 812 is done using a dedicated communication interface. A specific communication protocol is designed using a hybrid approach as mentioned above. Following the key exchange 812, bridge device 120 generates a master key 814 using a combination of classical and post quantum techniques. The bridge device 120 then computes a pre-master key 816 from the master key. Similarly, the gateway device 140 also generates a master key 818 using a combination of classical and post quantum techniques. The gateway device 140 then computes the pre-master key 820 from the master key. This allows establishment of a secure connection 830 between the gateway device 140 and the bridge device 120. After a key is established, the reading of sensor data 840 or writing of actuator data 860 may be performed securely as required.

During the reading of sensor data 840, the gateway device 140 sends a request for sensor data 842 to the bridge device 120. The packet comprising the request for sensor data 842 is encrypted by the gateway device 140 using the pre-master key. The bridge device 120 decrypts 844 the received packet using the pre-master key and then reads 846 the requested value from the sensor 111. The sensor values are encrypted 848 by the bridge device 120 using the pre-master key. Then the encrypted sensor data is sent 850 to the gateway device 140. The gateway device 140 then decrypts 852 the received packet using the pre-master key. Following decrypting the sensor data, the gateway device 140 may encrypt the sensor data and send it to the server.

During the writing of actuator data 860, the gateway device 140 encrypts 862 a command signal received from the server. The encrypted command signal is sent 864 to the bridge device 120. The bridge device 120 decrypts 866 the packet comprising the encrypted command signal using the pre-master key. The bridge device 120 then sends the command signal to the actuator 112.

Whilst the foregoing description has described exemplary embodiments, it will be understood by those skilled in the art that many variations of the embodiments can be made within the scope and spirit of the present invention.

The invention claimed is:

1. A gateway device comprising:
a first interface configured to receive command signals encrypted according to a first encryption protocol from a server and to send data signals encrypted according to the first encryption protocol to the server;
a second interface configured to send command signals encrypted according to a second encryption protocol to a bridge device and to receive data signals encrypted according to the second encryption protocol from the bridge device;
cryptographic key storage configured to store cryptographic keys for the first encryption protocol and cryptographic keys for the second encryption protocol; and
a processor configured to:
decrypt command signals encrypted according to the first encryption protocol using the cryptographic keys for the first encryption protocol and encrypt the command signals according to the second encryption protocol; and
decrypt data signals encrypted according to the second encryption protocol using the encryption keys for the second encryption protocol and encrypt the data signals according to the first encryption protocol.

2. A gateway device according to claim 1, wherein the first encryption protocol is a transport layer security (TLS) protocol.

3. A gateway device according to claim 1, wherein the second encryption protocol is a lightweight secure data communications protocol.

4. A gateway device according to claim 1, wherein the first encryption protocol and or the second encryption protocol is a hybrid of pre-quantum encryption algorithms and post-quantum algorithms.

5. A gateway device according to claim 1, wherein the processor is further operable to initiate a key exchange with the server and/or the bridge device.

6. A gateway device according to claim 1, wherein the processor is further configured to check and/or transform, and/or filter, and/or consolidate the command signals after decryption and before encryption.

7. A gateway device according to claim 1, wherein the processor is further configured to check and/or transform, and/or filter, and/or consolidate the data signals after decryption and before encryption.

8. A gateway device according to claim 1, wherein the processor is further configured to analyze the data signals and determine integrity of the data signals.

9. A gateway device according to claim 1, wherein the processor is further operable to monitor a power supply and/or tamper inputs to detect physical intrusions.

10. A gateway device according to claim 9, wherein the processor is operable to delete the cryptographic keys stored in the cryptographic key storage if a physical intrusion is detected.

11. A bridge device comprising:
a device interface configured to send command signals to an actuator device and to receive data signals from a sensor device;
a gateway interface configured to receive command signals encrypted according to an encryption protocol from a gateway device and to send data signals encrypted according to the encryption protocol to the gateway device;
cryptographic key storage configured to store encryption keys for the encryption protocol; and
a processor configured to decrypt command signals encrypted according to the encryption protocol and to send the decrypted command signals to the actuator device and to encrypt data signals received from the sensor device according to the encryption protocol and send the encrypted data signals to the gateway device.

12. A bridge device according to claim 11, wherein the encryption protocol is a lightweight secure data communications protocol.

13. A bridge device according to claim 11, wherein the first encryption protocol and or the second encryption protocol is a hybrid of pre-quantum encryption algorithms and post-quantum algorithms.

14. A bridge device according to claim 11, wherein the processor is further configured to check and/or transform, and/or filter, and/or consolidate the command signals after decryption and before sending to the sensor device.

15. A bridge device according to claim 11, wherein the processor is further configured to check and/or transform, and/or filter, and/or consolidate the data signals before encryption.

16. A bridge device according to claim 11, wherein the processor is further configured to analyze the data signals and determine integrity of the data signals.

17. A bridge device according to claim 11, wherein the processor is further operable to monitor a power supply and/or tamper inputs to detect physical intrusions.

18. A bridge device according to claim 11, wherein the processor is operable to delete the cryptographic keys stored in the cryptographic key storage if a physical intrusion is detected.

19. A monitoring system comprising: a gateway device; a bridge device; at least one sensor coupled to the bridge device; and at least one actuator coupled to the bridge device, the gateway device comprising:
a first interface configured to receive command signals encrypted according to a first encryption protocol from a server and to send data signals encrypted according to the first encryption protocol to the server;
a second interface configured to send command signals encrypted according to a second encryption protocol to the bridge device and to receive data signals encrypted according to the second encryption protocol from the bridge device;
cryptographic key storage configured to store cryptographic keys for the first encryption protocol cryptographic keys for the second encryption protocol; and
a processor configured to:
decrypt command signals encrypted according to the first encryption protocol using the cryptographic keys for the first encryption protocol and encrypt the command signals according to the second encryption protocol; and
decrypt data signals encrypted according to the second encryption protocol using the encryption keys for the second encryption protocol and encrypt the data signals according to the first encryption protocol,
the bridge device comprising:
a device interface configured to send command signals to an actuator device and to receive data signals from a sensor device;
a gateway interface configured to receive command signals encrypted according to the second encryption protocol from the gateway device and to send data signals encrypted according to the second encryption protocol to the gateway device;
cryptographic key storage configured to store encryption keys for the second encryption protocol; and
a processor configured to decrypt command signals encrypted according to the second encryption protocol and to send the decrypted command signals to the actuator device and to encrypt data signals received from the sensor device according to the encryption protocol and send the encrypted data signals to the gateway device.

\* \* \* \* \*